United States Patent
Wu et al.

(10) Patent No.: US 10,065,177 B2
(45) Date of Patent: Sep. 4, 2018

(54) SULFUR-RESISTANT CATALYST SUPPORT MATERIAL

(75) Inventors: Wei Wu, Ann Arbor, MI (US); Yunkui Li, Ann Arbor, MI (US); Jeffery Lachapelle, Northville, MI (US); Christopher Sketch, Troy, MI (US); Evan Leonard, Ann Arbor, MI (US); William Germond, Ann Arbor, MI (US)

(73) Assignee: Pacific Industrial Development Corporation, Ann Arbor, MI (US)

(*) Notice: Subject to any disclaimer, the term of this patent is extended or adjusted under 35 U.S.C. 154(b) by 1288 days.

(21) Appl. No.: 13/877,230

(22) PCT Filed: Oct. 4, 2011

(86) PCT No.: PCT/US2011/054735
§ 371 (c)(1),
(2), (4) Date: Jun. 5, 2013

(87) PCT Pub. No.: WO2012/047864
PCT Pub. Date: Apr. 12, 2012

(65) Prior Publication Data
US 2013/0252807 A1 Sep. 26, 2013

Related U.S. Application Data

(60) Provisional application No. 61/389,924, filed on Oct. 5, 2010.

(51) Int. Cl.
*B01J 21/00* (2006.01)
*B01J 21/12* (2006.01)
(Continued)

(52) U.S. Cl.
CPC .............. *B01J 21/12* (2013.01); *B01D 53/94* (2013.01); *B01J 21/066* (2013.01); *B01J 23/40* (2013.01);
(Continued)

(58) Field of Classification Search
USPC ......................................... 502/242, 100, 300
See application file for complete search history.

(56) References Cited

U.S. PATENT DOCUMENTS

| 3,869,522 A | 3/1975 | Van der Eijk |
| 6,679,986 B1 | 1/2004 | Da Silva et al. |

(Continued)

FOREIGN PATENT DOCUMENTS

| GB | 2 408 956 A | 6/2005 |
| WO | 2007/149799 A1 | 12/2007 |

OTHER PUBLICATIONS

European Patent Office, Rijswijk, Netherlands, International Search Report of International Application No. PCT/US2011/054735, dated Mar. 6, 2012, 4 pages.

*Primary Examiner* — James E McDonough
(74) *Attorney, Agent, or Firm* — Brinks Gilson & Lione

(57) ABSTRACT

A catalyst support material and a catalyst system incorporating said support material along with a method of making the same is provided for use in applications in which the support material is exposed to sulfur-containing impurities. The catalyst support material generally comprises an inorganic oxide base material having a surface and pores of predetermined size; and a zirconium layer adapted to interact with the surface and sized to be received by the pores of the base material. The catalyst support material being prepared by applying a layer of a zirconium compound to the surface and pores of an inorganic oxide base material
(Continued)

followed by calcination in order to convert the zirconium compound to a metal, a metal oxide, or a mixture thereof.

18 Claims, 4 Drawing Sheets

(51) Int. Cl.
| | |
|---|---|
| *B01D 53/94* | (2006.01) |
| *B01J 21/06* | (2006.01) |
| *B01J 23/40* | (2006.01) |
| *B01J 35/02* | (2006.01) |
| *B01J 35/10* | (2006.01) |
| *B01J 37/00* | (2006.01) |
| *B01J 37/02* | (2006.01) |
| *B01J 37/03* | (2006.01) |
| *B01J 23/00* | (2006.01) |
| *B01J 25/00* | (2006.01) |
| *B01J 29/00* | (2006.01) |

(52) U.S. Cl.
CPC ......... *B01J 35/026* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 37/0045* (2013.01); *B01J 37/0207* (2013.01); *B01J 37/0215* (2013.01); *B01J 37/0221* (2013.01); *B01J 37/0234* (2013.01); *B01J 37/03* (2013.01); *B01J 37/035* (2013.01); *B01J 37/038* (2013.01); *B01D 2255/20715* (2013.01); *B01D 2258/012* (2013.01)

(56) References Cited

U.S. PATENT DOCUMENTS

| | | |
|---|---|---|
| 2004/0030214 A1 | 2/2004 | Schindler et al. |
| 2006/0260983 A1 | 11/2006 | Iki et al. |
| 2010/0185010 A1* | 7/2010 | Hagemeyer ............... B01J 21/16 560/261 |
| 2010/0247817 A1* | 9/2010 | Nakano ................... B41M 5/52 428/32.34 |

* cited by examiner

SULFUR-RESISTANT CATALYST SUPPORT MATERIAL

CROSS REFERENCE TO RELATED APPLICATIONS

This application is a continuation of PCT Application Serial No. PCT/US2011/054735 filed Oct. 4, 2011, designating the United States and published in English, which claims the benefit of the filing date under 35 U.S.C. 119(e) of U.S. Provisional Application No. 61/389,924 filed Oct. 5, 2010, the entire contents of each of which are hereby incorporated herein by reference.

FIELD

This disclosure relates generally to a catalyst support material that is highly resistant to sulfur poisoning and a method for its use. More particularly, this disclosure relates to the preparation and use of inorganic oxide supports that exhibit reduced adsorption of catalyst poisons.

BACKGROUND

Sulfur represents an impurity that is frequently encountered in many commercial catalytic processes, such as hydrogenation, hydrocracking, reforming, methanation, and synthesis. Unfortunately, these sulfur impurities ($H_2S$, RSH, RSSR, etc.) are known to act as a poison for catalytic processes that utilize a reduced metal as the primary active phase. A poison will typically impair the performance of a heterogeneous catalyst system by reducing the systems overall catalytic activity. The presence of sulfur impurities may cause a significant decrease in catalytic activity even at very low concentrations due to their ability to adsorb onto sites at the surface of the metal catalyst and support material and due to their ability to form very stable adsorbed species under a variety of different reaction conditions. The formation of stable adsorbed species prevents the reactant molecules from accessing catalytically active sites, thereby, decreasing the overall catalytic activity for the catalyst system.

One specific example, of a catalytic process that is susceptible to sulfur poisoning is the catalytic treatment of exhaust gases arising from a combustion engine, such as a diesel engine. Diesel fuel typically contains a significant amount of sulfur, which when burnt, is converted to sulfur compounds such as sulfur dioxide. Sulfur dioxide in the exhaust gas oxidizes the catalyst support material yielding sulfur trioxide which reacts with water to create a sulfate such as sulfuric acid. Sulfates are not able to revert back to a gas. This creates a buildup of sulfates on the catalyst support material and leads to the loss of acidic active sites. The loss of acidic active sites on the catalyst support material reduces the activity of the overall catalyst system. In addition sulfur contamination of the catalyst support material may also result in decreased surface area due to blocking of pores in the catalyst structure.

SUMMARY

The present disclosure provides a catalyst support material for use in applications in which the support material is exposed to sulfur-containing impurities. The catalyst support material generally comprises an inorganic oxide base material having a surface and pores of predetermined size and a zirconium layer adapted to interact with the surface and sized to be received by the pores of the base material. The zirconium may be zirconium metal, zirconium oxide, or a mixture thereof, while the inorganic oxide base material is one selected from the group of aluminum oxides, silicon oxides, titanium oxides, and aluminum silicates. The catalyst support material may have the shape of a powder, beads, or pellets.

According to another aspect of the present disclosure, a supported catalyst system for use in catalyzing reactions subjected to the presence of sulfur-containing impurities is provided. This catalyst system generally comprises a catalyst and a catalyst support material that includes an inorganic oxide base material having a surface and pores of predetermined sized and a zirconium layer adapted to interact with the surface and sized to be received by the pores of the base material. The catalyst, which is incorporate with the catalyst support material in an amount ranging from about 0.1 to 10 wt. %, is selected as one from the group of transition metals, transition metal oxides, alkaline earth metal oxides, rare-earth oxides, and mixtures thereof.

According to yet another aspect of the present disclosure, a method of preparing a catalyst support material for use in a supported catalyst system that is exposed to the presence of sulfur-containing impurities is provided. This method generally comprises the steps of: providing an inorganic oxide base material having a surface and pores of predetermined size; providing a zirconium compound; applying a layer of the zirconium compound to at least a portion of the surface and pores of the base material to form a coated base material; and calcining the coated base material at a predetermined temperature. The calcining of the coated base material at a temperature in the range of 500 to 1200° C. causes the zirconium compound to be converted to one selected from the group of zirconium metal, zirconium oxide, or a mixture thereof. The step of applying a layer of the zirconium compound to the base material may use one selected from the group of impregnation, co-precipitation, and spray drying (SD). The zirconium compound may be selected as one from the group of zirconium acetate, zirconium citrate, and zirconium oxalate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
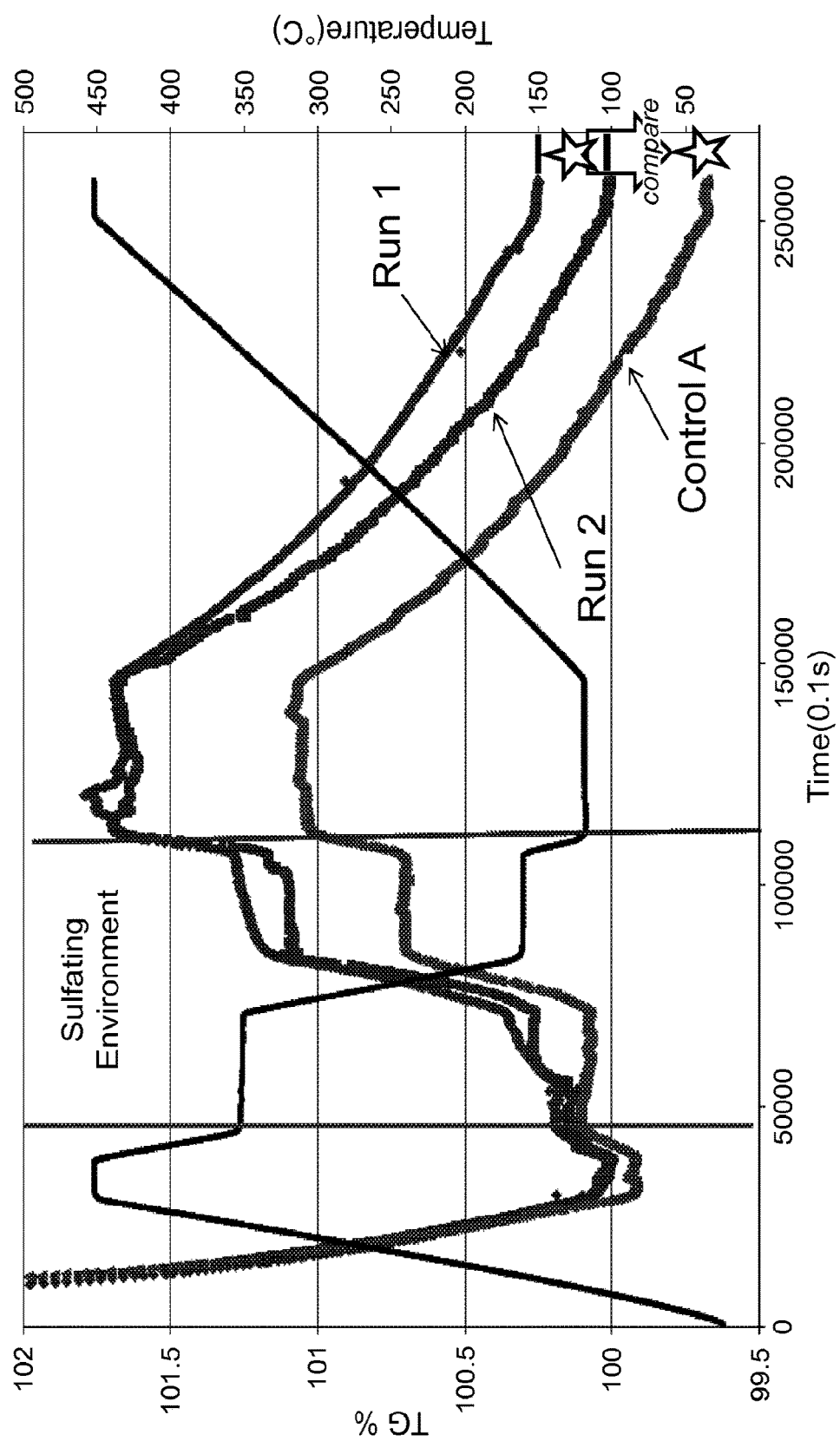
FIG. 1 is a graphical representation of the weight gain that occurs in a conventional sulfur-resistant catalyst support material after exposure to a stream containing sulfur impurities.

The following description is merely exemplary in nature and is in no way intended to limit the present disclosure or its application or uses. For example, a catalyst support material made and used according to the teachings contained herein is described throughout the present disclosure in conjunction with an oxidation catalyst for use in an automotive catalytic converter in order to more fully illustrate the system and method of use. The incorporation and use of such a catalyst support material in conjunction with other catalyst systems is contemplated to be within the scope of the disclosure. It should be understood that throughout the description and drawings, corresponding reference numerals indicate like or corresponding parts and features.

The present disclosure generally provides a sulfur-resistant catalyst support material and a catalyst made therefrom. The catalyst support material prepared according to the teachings of the present disclosure exhibits a high resistance to sulfur poisoning. The catalyst support material is useful as a part of a chemical catalyst for use in diesel applications and in other chemical processes where sulfur poisoning may occur. The catalyst support material of the present disclosure, generally, comprises an inorganic oxide base material and a zirconium (Zr) layer applied thereupon. The zirconium layer may include zirconium metal, zirconium oxide, or the like.

The inorganic oxide base material may include, but not be limited to, aluminum silicates (e.g., zeolites), aluminum oxides (e.g., alumina), silicon oxides (e.g., silica), titanium oxides (e.g., titania), or combinations thereof. Various forms of aluminum oxide may be used as the base material because of their availability, thermal properties, and ability to enhance catalytic activity associated with metal catalysts. However, aluminum oxide is known to be highly susceptible to the adsorption of sulfur and/or sulfur-containing compounds that can poison a metal catalyst system, thereby, causing a reduction in both catalyst activity and the useful life associated with the catalyst system.

The aluminum oxides, silicon oxides, titanium oxides, or aluminum silicates used in the base material of the present disclosure may be in any form selected or desirable by one skilled-in-the-art for use in a particular application. For example, the aluminum oxide may include, but not be limited to, γ-alumina, δ-alumina, θ-alumina, α-alumina, and aluminum monohydrate. The silicon dioxide may include fumed silica, precipitated silica, and silica gel, among others; while the titanium dioxide may include, but not be limited to, rutile, anatase, brookite, or cubic forms thereof.

Combinations of the inorganic oxides used as the base material may be obtained by any method or technique known to one skilled-in-the-art. Such techniques may include, mixing, milling, impregnation, and co-precipitation techniques, among others. The different inorganic oxides present in the base material may interact as individual discrete particles, as a coating of one inorganic oxide on the surface of or within the pores of another inorganic oxide, or within the confines of its own crystal structure (e.g., zeolites). The resulting base material prepared using combinations of inorganic oxides can still exhibit a high degree of susceptibility to sulfur poisoning because it will still contain a substantial amount of exposed active sites.

The base material, preferably, exhibits a relatively high BET surface area. Such a BET surface area may be in the range of about 20 to 400 $m^2/g$, alternatively in the range of about 75 to 300 $m^2/g$. The base material of the catalyst support will have a pore volume within the range of about 0.1 to 2 cc/g; alternatively within the range between about 0.5 to 1.5 cc/g. The base material will further have an average pore diameter within the range of about 25 to 1000 Angstroms, alternatively from 50 to 500 Angstroms.

The zirconium (Zr) layer applied upon the inorganic oxides of the base material may be derived from a coating of any zirconium compound known to one skilled-in-the-art that can effectively interact with the exposed surface of the inorganic oxides of the base material. Several examples of such zirconium compounds include zirconium acetate, zirconium citrate, and zirconium oxalate. The zirconium compound may be applied to the inorganic oxides of the base material through the use of any known methods or techniques, such as impregnation, co-precipitation, and spray drying (SD), among others.

During impregnation, the zirconium compound is first dissolved in an aqueous or organic solution and then placed in contact with the base material. Capillary action is used to draw the solution onto the surface and into the pores of the base material. Upon drying the impregnated base material, volatile components associated with the solution are removed. The base material may be calcined to convert the zirconium compound to zirconium metal, zirconium oxide, or the like. The maximum loading of zirconium in the base material is limited by the solubility of the zirconium compound in the solution. The concentration profile for the impregnated zirconium compound, and subsequently the distribution of zirconium oxide within the base material depends upon the mass transfer conditions present within the pores during impregnation, drying, and calcining.

During the use of the spray drying (SD) technique, the zirconium compound and the base material are mixed or homogenized with an aqueous or organic liquid to form a slurry. The slurry, which is fed through a spray drier and atomized, forms drops or particles having a large surface area with the zirconium compound residing approximate to the exposed surface of the base material. Subsequent calcination of the catalyst support material may be used to convert the zirconium compound to zirconium oxide, zirconium metal, or the like.

The amount of zirconium present within the catalyst support material is dependent upon the desired application and the amount of expected exposure to sulfur containing impurities during its useful lifetime. The zirconium may be present in the catalyst support material in an amount ranging between about 1% and 30% by weight; alternatively ranging between about 5% and 20% by weight.

The catalyst support material may be in the form of a powder, beads, or pellets. When in powder form, the support material will exhibit an average particle size on the order of about 1 to 200 μm, alternatively from 10 to 100 μm. When in bead or pellet form, the support material will exhibit an average particle size ranging from about 1 mm to 10 mm. The actual size and particular shape of the catalyst support material is dependent upon the selected or desired application.

A muffle furnace, a tube furnace, or the like may be used to calcine the catalyst support material. The temperature of calcination will generally be between 500 to 1200° C., alternatively between about 700 and 900° C. The calcination may be done over a period of time ranging between about 1 to 48 hours or alternatively between about 2 to 18 hours.

The catalyst support materials of the present disclosure may be used in conjunction with any conventional catalyst or catalysts known to one skilled-in-the-art that is susceptible to sulfur poisoning. Examples of such catalysts include transition metals and their oxides, alkaline earth metal oxides, and rare-earth oxides, or the like and mixtures thereof. The catalysts may be incorporated into or with the catalyst support materials in small amounts with such amounts being predetermined upon the selected application and the amount of catalytic activity desired. Typically, the catalyst will be incorporated with the catalyst support material in an amount ranging from about 0.1 to 10 wt. %, alternatively from about 1 to 5 wt. %.

Referring to FIG. 1, thermogravimetric analysis is used to determine the percentage increase in the weight of a conventional sulfur resistant support material exposed to the exhaust gases derived from a diesel engine. The amount of the sulfur impurities adsorbed onto the surface and into the pores of the support material is determined by comparing the final weight increase in the catalyst support (Runs 1 and 2) exposed to the exhaust gases against the weight loss observed for the same catalyst support (Control A) prior to be exposed to the exhaust gases. The amount of sulfur containing species adsorbed onto the support material is on the order of 0.4% to 0.6%.

Figure 2:
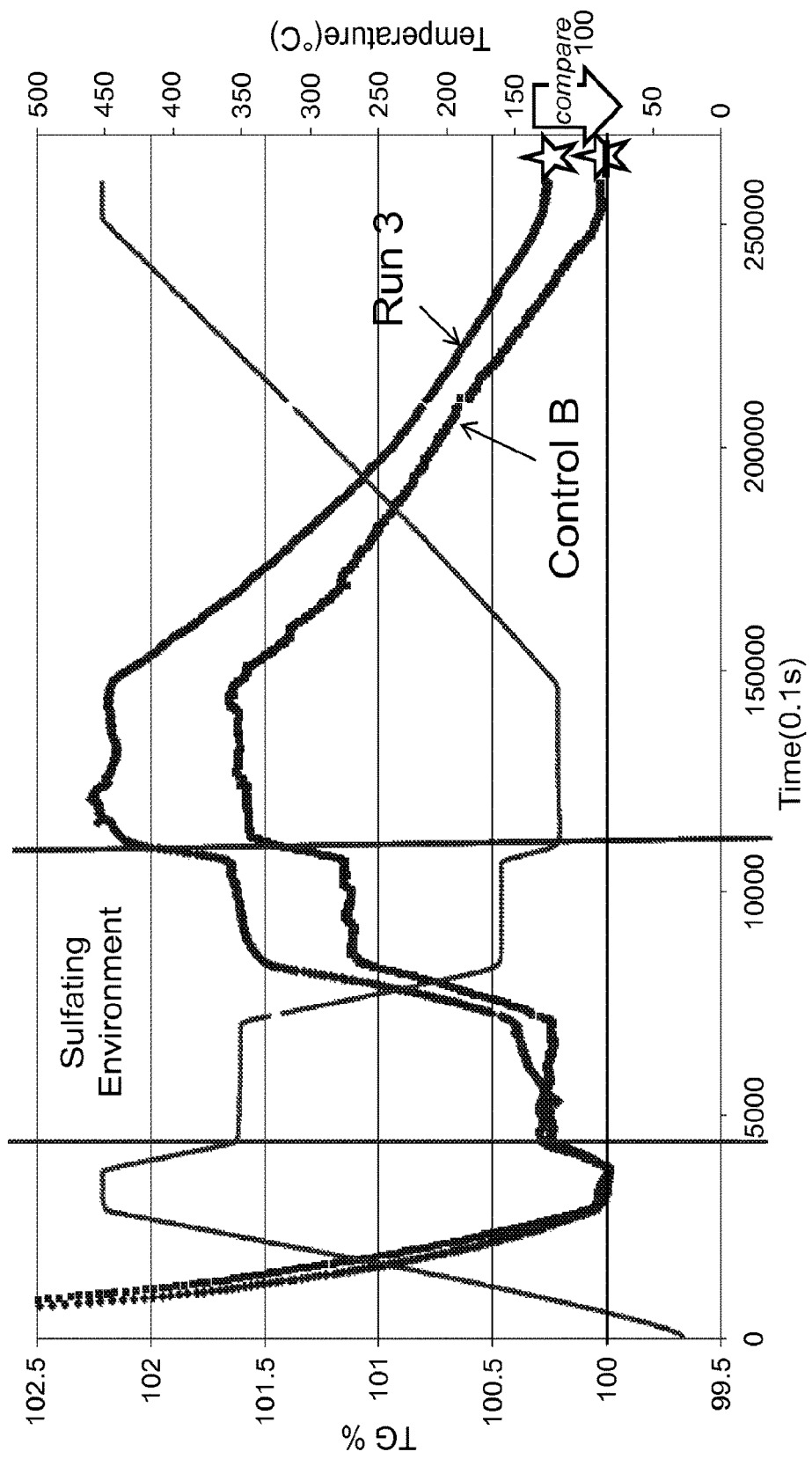
FIG. 2 is a graphical representation of the weight gain that occurs in a catalyst support material made according to the teachings of the present disclosure after exposure to an exhaust gas containing sulfur impurities.

Referring now to FIG. 2, thermogravimetric analysis is used to determine the percentage increase in the weight of a catalyst support material prepared according to the teachings of the present disclosure exposed to similar conditions as the support material in FIG. 1. The catalyst support material in this example comprised a base material and a zirconium layer in an amount of about 84% and 16%, respectively. The base material was comprised of a mixture of alumina and silica in a ratio of about 2:1. The zirconium was incorporated into the catalyst support material through the use of the impregnation technique.

Still referring to FIG. 2, the amount of the sulfur impurities adsorbed onto the surface and into the pores of the catalyst support material of the present disclosure is determined by comparing the final weight increase in the catalyst support material (Run 3) exposed to the exhaust gases against the weight loss observed for the same catalyst support material (Control B) prior to be exposed to the exhaust gases. The amount of sulfur containing species adsorbed onto the catalyst support material prepared according to the present disclosure using the impregnation technique is on the order of 0.3%.

Figure 3:
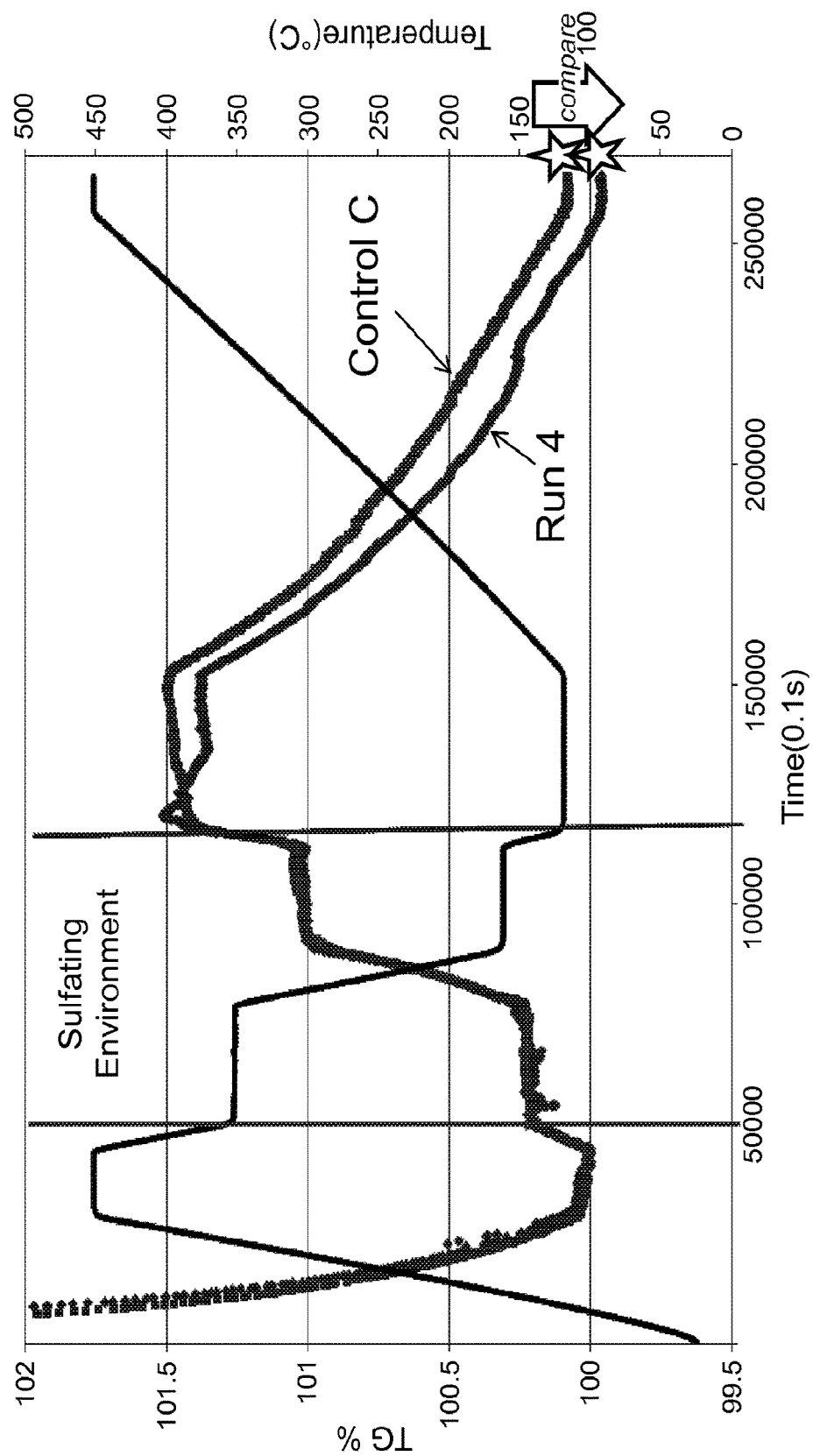
FIG. 3 is a graphical representation of the weight gain that occurs in a catalyst support material made according to another aspect of the present disclosure after exposure to an exhaust gas containing sulfur impurities.

Referring now to FIG. 3, thermogravimetric analysis is used to determine the percentage increase in the weight of a catalyst support material prepared according to the teachings of the present disclosure exposed to similar conditions as the support material in FIG. 1. The catalyst support material in this example comprised a base material and a zirconium layer in an amount of about 84% and 16%, respectively. The base material was comprised of a mixture of alumina and silica in a ratio of about 2:1. The zirconium was incorporated into the catalyst support material through the use of the spray drying (SD) technique.

Still referring to FIG. 3, the amount of the sulfur impurities adsorbed onto the surface and into the pores of the catalyst support material of the present disclosure is determined by comparing the final weight increase in the catalyst support material (Run 4) exposed to the exhaust gases against the weight loss observed for the same catalyst support material (Control C) prior to be exposed to the exhaust gases. The amount of sulfur containing species adsorbed onto the catalyst support material prepared according to the present disclosure using the SD technique is on the order of 0.2%.

Figure 4:
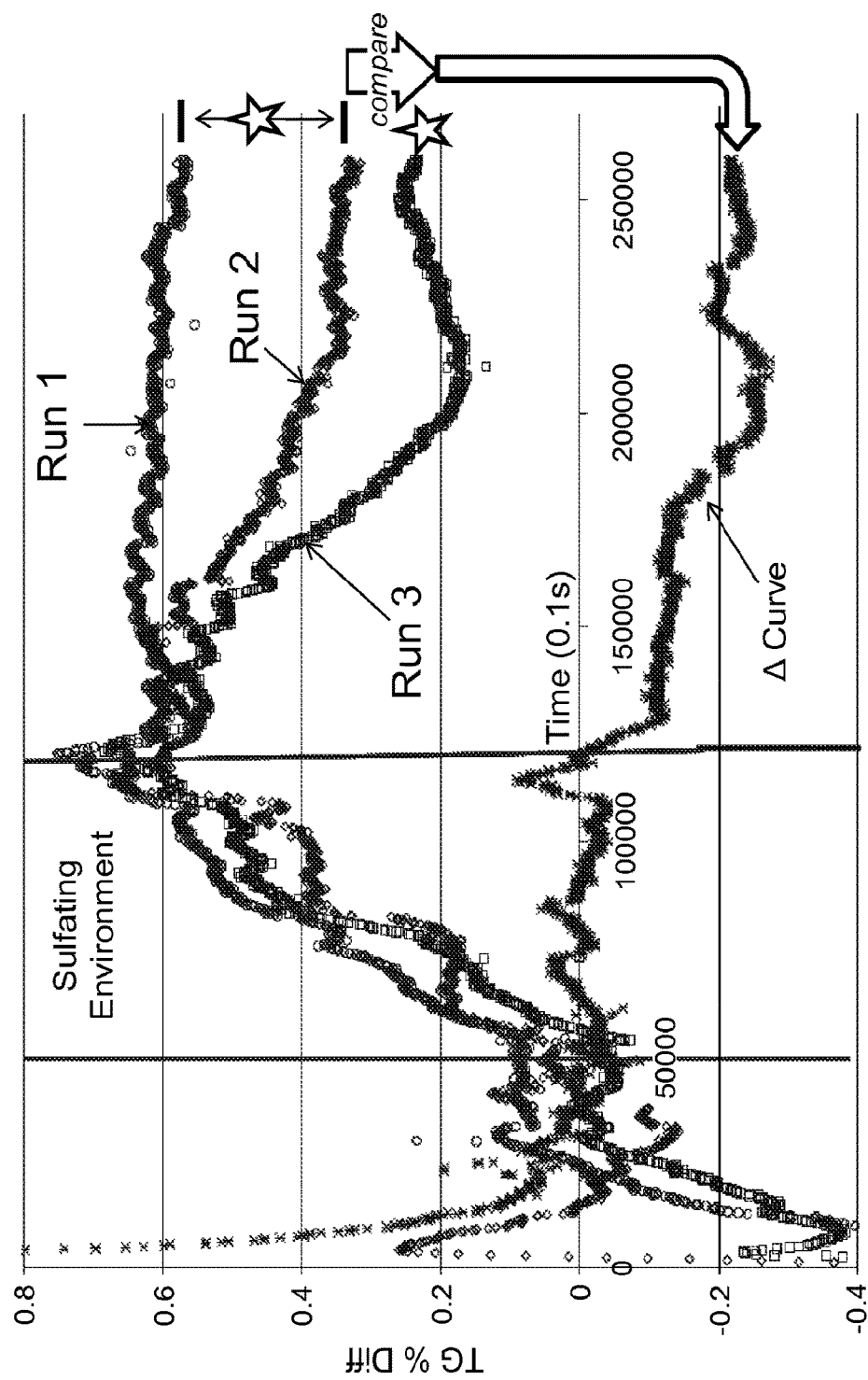
FIG. 4 is a graphical comparison of the weight gain between the conventional sulfur-resistant catalyst support material of FIG. 1 and the catalyst support materials of FIG. 2 and FIG. 3.

Referring now to FIG. 4, a direct comparison of the weight gain observed in the conventional support materials (Runs 1 and 2) and the catalyst support material (Run 3) prepared according to the teachings of the present disclosure using the impregnation technique is provided as a function of time. The resulting difference between the support materials is shown in the resulting A curve. The catalyst support material of the present disclosure exhibits at least about a 0.2% decrease in the amount of sulfur species that are adsorbed onto the surface or within the pores of the support. The catalyst support material prepared according to the present disclosure is more resistant to poisoning by sulfur-containing species than conventional support materials.

The following specific examples are given to illustrate the invention and should not be construed to limit the scope of the disclosure.

Example 1—Preparation of Catalyst Support by Impregnation

A zirconium oxy-acetate solution is prepared by adding 21.5 g of zirconium carbonate to 40 g of water and 10 g of acetic acid. The solution is mixed at 60° C. until the zirconium carbonate completely dissolves. The solution is added drop-wise onto 50 g silicon aluminum oxide, while mixing the oxide. The powder is then fired at 800° C. for five hours in a box furnace to yield a sulfur-resistant catalyst support.

Example 2—Preparation of Catalyst Support by Spray Drying

A zirconium oxy-acetate solution is formed by mixing 0.593 kg of acetic acid with 4.4 L of deionized water, and slowly adding 1.262 kg of zirconium carbonate while stirring. The solution is mixed at 60-70° C. at a pH of 4.33 until the zirconium oxy-acetate solution is clear. A silica-alumina solution is formed by adding 2.947 kg of a 30% silica 70% alumina to 0.111 L of acetic acid and 9.6 L of deionized water while maintaining a pH of approximately 4.4. The zirconium oxy-acetate solution is added into the silica alumina solution and mixed for one hour. The solution is spray dried with an inlet temperature of 350-360° C., an outlet temperature of 100-110° C., a pump speed of about 5 L per hour, and a compressed air pressure of about 20 psi. The powder is fired at 800° C. for five hours in a box furnace to yield a sulfur-resistant catalyst support.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A catalyst support material for use in applications in which the support material is exposed to sulfur-containing impurities in an exhaust gas, the catalyst support material comprising:

an inorganic oxide base material having a BET surface area in the range of 20 to 400 $m^2/g$ and pores defined by a pore volume in the range of 0.1 cc/g to 2 cc/g and a pore diameter between 25 angstroms to 1000 angstroms; the inorganic oxide base material being alumina, silica, titania, or combinations thereof; and a zirconium layer derived from a coating of a zirconium compound, applied to the surface and drawn into the pores of the base material by capillary action; the amount of zirconium in the zirconium layer ranges between about 5% and 20% by weight;

wherein the catalyst support material exhibits a resistance to the absorption of the sulfur-containing impurities.

2. The catalyst support material of claim 1, wherein the zirconium layer is zirconium metal, zirconium oxide, or a mixture thereof.

3. The catalyst support material of claim 1, wherein the surface of the base material has a size given as a BET surface area in the range of 75 to 300 m$^2$/g.

4. The catalyst support material of claim 1, wherein the inorganic oxide base material is one selected from the group of γ-alumina, δ-alumina, θ-alumina, a-alumina, aluminum monohydrate, fumed silica, precipitated silica, silica gel, rutile TiO$_2$, anatase TiO$_2$, brookite TiO$_2$, cubic forms of titania, and combinations thereof.

5. The catalyst support material of claim 1, wherein the catalyst support material has the shape of a powder, beads, or pellets.

6. A supported catalyst system for use in catalyzing reactions subjected to the presence of sulfur-containing impurities in an exhaust gas, the catalyst system comprising a catalyst and a catalyst support material; the catalyst support material comprising:

an inorganic oxide base material having a BET surface area in the range of 20 to 400 m$^2$/g and pores defined by a pore volume in the range of 0.1 cc/g to 2 cc/g and a pore diameter between 25 angstroms to 1000 angstroms; the inorganic oxide base material being alumina, silica, titania, or combinations thereof; and a zirconium layer derived from a coating of a zirconium compound, applied to the surface and drawn into the pores of the base material by capillary action; the amount of zirconium in the zirconium layer ranges between about 5% and 20% by weight;

wherein the catalyst support material exhibits a resistance to the absorption of the sulfur-containing impurities.

7. The supported catalyst system of claim 6, wherein the catalyst is one selected from the group of transition metals, transition metal oxides, alkaline earth metal oxides, rare-earth oxides, and mixtures thereof.

8. The supported catalyst system of claim 6, wherein the catalyst is incorporated in an amount ranging from about 0.1 to 10 wt. %.

9. A method of preparing a catalyst support material for use in a supported catalyst system that is exposed to the presence of sulfur-containing impurities in an exhaust gas, the method comprising the steps of:

providing an inorganic oxide base material having a BET surface area in the range of 20 to 400 m2/g and pores defined by a pore volume in the range of 0.1 cc/g to 2 cc/g and a pore diameter between 25 angstroms to 1000 angstroms; the inorganic oxide base material being alumina, silica, titania, or combinations thereof;

providing a zirconium compound;

applying a coating of the zirconium compound to at least a portion of the surface and drawn into the pores by capillary action of the base material to form a coated base material; and converting the coating of the zirconium compound into a layer of zirconium metal, zirconium oxide, or a mixture thereof;

wherein the amount of zirconium in the zirconium layer ranges between about 5% and 20% by weight;

wherein the catalyst support material exhibits a resistance to the absorption of the sulfur-containing impurities.

10. The method of claim 9, wherein forming a coated base material by applying a coating of the zirconium compound to at least a portion of the surface and drawn into the pores of the base material is done using a process selected from the group of impregnation, co-precipitation, and spray drying (SD).

11. The method of claim 9, wherein the zirconium compound that is applied to the surface and into the pores of the base material is selected from the group of zirconium acetate, zirconium citrate, and zirconium oxalate.

12. The method of claim 9, wherein converting the coating of zirconium compound into the zirconium metal, zirconium oxide, or mixture thereof is accomplished by calcining the coated base material at a temperature in the range of 500 to 1200° C.

13. The supported catalyst system of claim 6, wherein the zirconium layer in the catalyst support material is zirconium metal, zirconium oxide, or a mixture thereof.

14. The supported catalyst system of claim 6, wherein the surface of the base material in the catalyst support material has a size given as a BET surface area in the range of about 75 to 300 m$^2$/g.

15. The supported catalyst system of claim 6, wherein the inorganic oxide base material in the catalyst support material is one selected from the group of γ-alumina, δ-alumina, θ-alumina, a-alumina, aluminum monohydrate, fumed silica, precipitated silica, silica gel, rutile TiO$_2$, anatase TiO$_2$, brookite TiO$_2$, cubic forms of titania, and combinations thereof.

16. The supported catalyst system of claim 6, wherein the catalyst support material has the shape of a powder, beads, or pellets.

17. The catalyst support material of claim 1, wherein the catalyst support material exhibits at least a 0.2% decrease in the amount of sulfur-containing impurities that are absorbed onto the surface or within the pores as compared to the same inorganic oxide base material in the absence of the zirconium layer as determined by thermogravimetric analysis.

18. The catalyst support material of claim 1, wherein the catalyst support material comprises about 84% of the inorganic oxide base material and about 16% of the zirconium layer.

* * * * *